H. THEOBALD.
WEIGHING SCALE.
APPLICATION FILED MAR. 29, 1916.

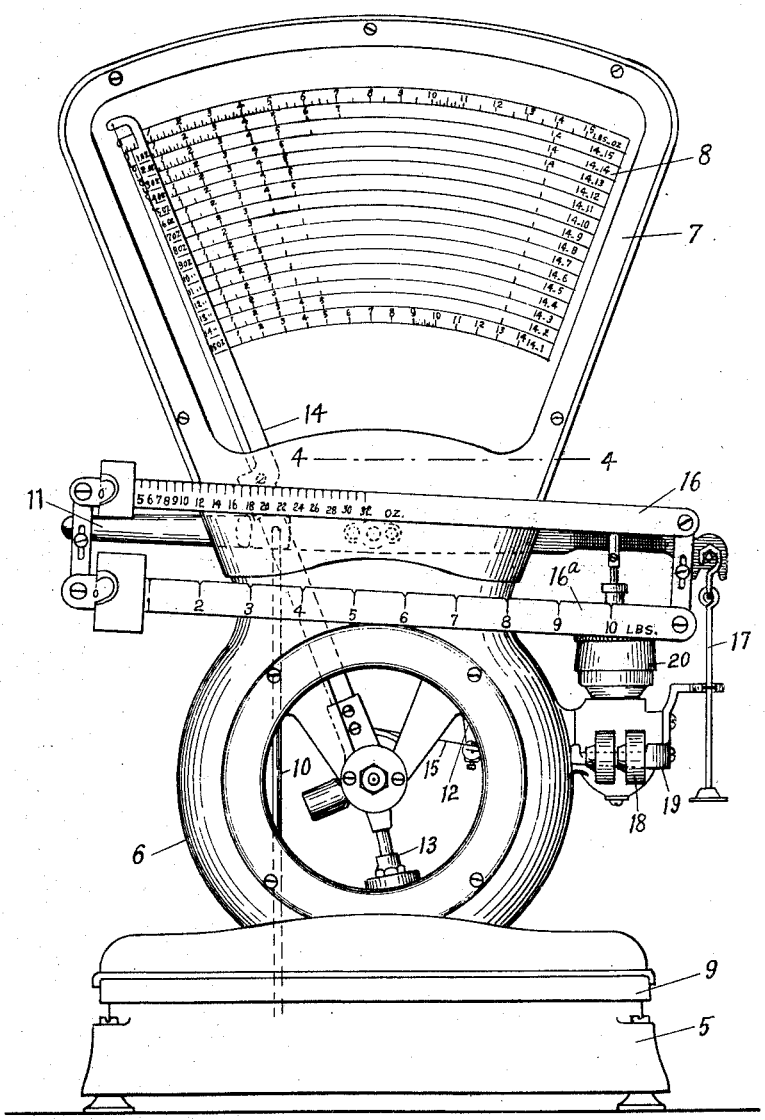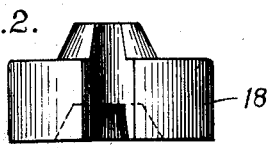

1,385,406.

Patented July 26, 1921.
2 SHEETS—SHEET 2.

WITNESSES:
D. C. Walter
O. Zinke

INVENTOR.
Henry Theobald
by George R. Frye
ATTORNEY

UNITED STATES PATENT OFFICE.

HENRY THEOBALD, OF TOLEDO, OHIO, ASSIGNOR TO TOLEDO SCALE COMPANY, OF TOLEDO, OHIO, A CORPORATION OF NEW JERSEY.

WEIGHING-SCALE.

1,385,406.  Specification of Letters Patent.  Patented July 26, 1921.

Application filed March 29, 1916. Serial No. 87,412.

*To all whom it may concern:*

Be it known that I, HENRY THEOBALD, a citizen of the United States, residing at Toledo, in the county of Lucas and State of Ohio, have invented certain new and useful Improvements in Weighing-Scales, of which the following is a specification.

The present invention relates to weighing scales equipped for readily ascertaining the net weight of goods weighed in receptacles which may themselves vary considerably in weight, and the principal object is to provide a construction of weighing scales which can be conveniently and expeditiously used where one article after another is to be weighed in quick succession, as, for example, in cracker factories, in the handling of the filled boxes which arrive at the weighing station over continuously moving conveyers. The present invention provides not only for quick weighing under such conditions, but also for accounting for tare, and if desired, for separately accounting for the items of a composite tare, as, for instance, denoting the weight of the fillers and partitions of a box of crackers, which weights in the case of crackers are usually conveniently displayed so that the operator of the weighing apparatus can ascertain at a glance how much tare is to be provided for.

With these and incidental objects in view, the invention consists in certain novel features of construction and combinations of parts, the essential elements whereof are recited in the appended claims and a preferred form of embodiment of which is described in detail hereinafter and illustrated in the accompanying drawings.

Of said drawings,

Figure 1 represents in front elevation a scale constructed in accordance with the present invention.

Fig. 2 is a side elevation of one of the supplemental weights adapted to be used with the scale.

Figure 3:
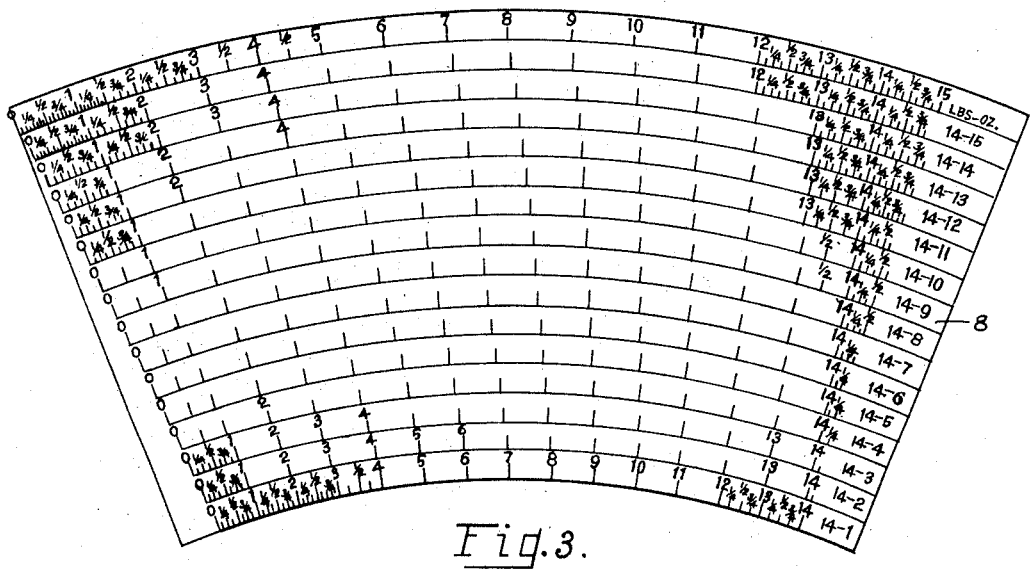
Fig. 3 is an enlarged detail elevation of the chart utilized therein.

In the particular scale chosen to exemplify my invention, a hollow base 5 supports at one end a housing 6 upon which is mounted a fan-shaped casing 7 carrying the indicator chart 8. The hollow base 5 is adapted to contain a leverage system (not shown) upon which is supported a goods receiver or platform 9 as is common in scales of this character, and the leverage system is connected by a link 10 with a substantially horizontally-disposed scale beam 11 mounted in the housing 6 intermediate the base and the chart casing, the beam 11 being suitably connected, as through the depending arm 12, with the pendulum counterbalance 13 carrying an indicator hand 14, a strap or ribbon 15 being preferably connected at its opposite ends to the pendulum counterbalance and the depending arm 12 respectively. The scale beam preferably carries one or more tare beams 16 and may also support a supplemental weight support 17 adjacent its outer end, upon which may be placed, as desired, the supplemental weights 18. When the supplemental weights are not in use they preferably rest upon a bracket 19 extending from the casing 6. To damp the movement of the weighing mechanism, a dash pot 20 is employed, being preferably connected, as herein shown, with the scale beam 11.

Figure 4:
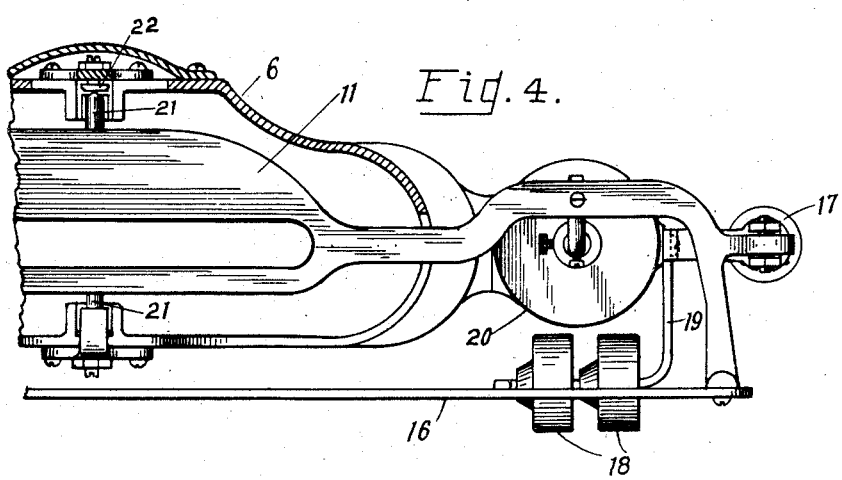
Fig. 4 is an enlarged sectional view taken substantially on the line 4—4 of Fig. 1 and particularly showing the mounting of the scale beam and associated parts.

It is to be understood that any suitable platform and platform lever mechanism may be employed in connection with the scale beam 11 and pendulum counterbalance of the scale, the weighing mechanism herein shown being designed to satisfactorily operate when employed in various kinds of scales. The scale beam 11 is provided with oppositely-extending knife edge pivots 21 resting upon bearings suitably mounted in brackets carried by the front and rear walls of the casing 6, as shown in Fig. 4, suitable adjusting devices, as shown at 22, being employed to prevent end thrust of the pivots and to retain the scale beam in position for accurate weighing.

The chart 8 is preferably made substantially as shown in Fig. 3, being similar in contour and design to computing charts or tables such as are used in certain types of computing scales. However, the chart 8 bears no price or value computations, but carries a series of rows of weight numerals each graduated and marked with weights arranged so as to be of particular advantage in determining net weights such as the contents of packages, and also to account for and indicate the terminal or fractional pound amounts of tare weight, as will be hereinafter pointed out. These rows of weight numerals are preferably arranged concentrically, as shown, and the uppermost circumferential row on the chart 8 is graduated and marked from zero to 15 lbs., the zero indication being placed at one edge of the chart and the 15 lb. graduation being marked at the other end thereof. The second circumferential row, as shown, is marked from zero to 14 lbs. and 15 ozs., (or 1 oz. less than the uppermost row), the zero graduation being in radial alinement with the 1 oz. graduation of the uppermost row, while the 14 lb. and 15 oz. graduation is in radial alinement with the 15 lb. graduation in the uppermost row. The next adjacent row is graduated from zero to 14 lbs. and 14 ozs., (or 1 oz. less than the second circumferential row and 2 ozs. less than the uppermost row of the chart). The zero graduation in this third circumferential row is in radial alinement with the 1 oz. graduation of the second row, and therefore in alinement with the 2 oz. graduation mark on the uppermost row, while the last graduation mark on the third row is in radial alinement with the 14 lb. 15 oz. mark of the second row and the 15 lb. mark of the uppermost row. Similarly, each of the remaining rows on the chart is arranged so that their zero indication is in radial alinement with the 1 oz. graduation on the next row above, and their terminal graduation is 1 oz. less than that of the next row above. Preferably sixteen circumferential rows are employed, the zero mark on the uppermost row being at the extreme edge of the chart and the zero mark of each of the other rows being spaced progressively 1 oz behind that of the next row above, the zero mark of the lowermost row being in radial alinement with the 15 oz. graduation on the uppermost row.

To effectively coöperate with the several circumferential rows of the chart 8 the index hand 14 is marked substantially as shown in Fig. 1, that portion of the index hand in alinement with the uppermost row being unmarked, that portion in alinement with the first adjacent row being marked 1 oz., that in alinement with the next adjacent row being marked 2 ozs. and so on, the indication or marking on the index hand 14 indicating that the alining circumferental row is 1 oz. behind the uppermost row, 2 ozs. behind, and so on.

As herein shown, the scale beam 11 carries upper and lower tare beams 16 and 16ᵃ respectively, the uppermost tare beam 16 being graduated by ounces for a portion of its lengths, and the lowermost tare beam 16ᵃ being graduated by pounds. Slidable poises coöperate with these tare beams in the customary manner.

In using scales such as above described, the commodity whose weight is to be ascertained is placed upon the platform 9 in its receptacle and, the weight of the receptacle having been first ascertained or being already known, the poise on the lowermost tare beam 16ᵃ is moved out to the point on the beam offsetting the full pounds of tare, the fractional pound portion of the tare being left to be offset by the pendulum counterbalance, which also offsets the net weight of the contents of the receptacle. The weight of the contents of the package is then read in that circumferential row on the chart 8 in alinement with the ounce numeral on the index hand corresponding to the fractional pound portion of the tare. Thus, if the tare weight of a box of crackers is 4 lbs. 6 ozs., the poise on the beam 16ᵃ would be moved out to the 4 lb. graduation on said beam and the filled receptacle placed upon the platform 9. The net weight of the package would then be read in the circumferential row on the chart 8 in alinement with the 6 oz. mark on the index hand; the 6 ozs. of the tare remaining over and above the full pound portion which was offset by the poise on the beam 16ᵃ being accounted for by the spacing of the zero indication in the particular row in which the net weight of the receptacle is read. If the tare is expressed in full pounds only, the entire tare can be taken up on the beam 16ᵃ and the net weight of the contents would be read in the uppermost row on the chart.

The above described mechanism would be sufficient to take up a composite tare, provided the several items of such a tare were first added together and the total tare offset in full pounds on the tare beam and the fractional pound portion on the pendulum counterbalance in the manner above described. However, to eliminate additions or mental calculations, the uppermost tare beam 16 is preferably provided and graduated as may be needed for the particular weighings for which the scale is intended. As herein shown, the upper tare beam 16 is graduated by ounces and only for a portion of its length, and in offsetting a composite tare is used as follows: Supposing a box of crackers weighs 4 lbs., 6 ozs., and the fillers and partitions utilized therein weigh 17 ozs., the full pound portion of the weight of the box is offset on the lower tare beam 16ᵃ in the manner above described, and the fractional portion of this tare left to be offset by the pendulum counterbalance. The tare for the filler and contents is then offset by moving the poise on the upper tare beam 16 to the 17 oz. graduation. The net weight of the box would then be indicated on the chart in the row alining with the 6 oz. marking on the index hand.

The supplemental weights 18 may be placed upon the weight support 17 to increase the capacity of the scale in the well-known manner, this increase being either for tare or for net weights, as desired.

From the above it will be apparent that the illustrated embodiment of my invention provides means well calculated to adequately fulfil the objects primarily stated. The construction is, however, susceptible to modification, variation and change without departing from the spirit and scope of the invention as set forth in the following claims.

Having described my invention, I claim:

1. In a scale, and in combination with the weighing mechanism thereof, a fixed chart having a plurality of rows of weight indications thereon, said rows having their zero indications angularly spaced progressively out of alinement with each other, and a swinging index hand coöperating with all of said rows and bearing indications distinguishing the several rows by the extent of the displacement of their zero indications.

2. In a scale, and in combination with the weighing mechanism thereof, a fixed chart having a plurality of rows of weight indications thereon, one of said rows having its zero indication adjacent one edge of the chart, and the other rows having their zero indications angularly spaced progressively farther away from this edge of the chart, and a swinging index hand coöperating with all of said rows and bearing indications distinguishing the several rows by the extent of the displacement of their zero indications.

3. In a scale, and in combination with the weighing mechanism thereof, a fixed chart having a plurality of rows of weight indications thereon, one of said rows having its zero indication adjacent one edge of the chart, and the remaining rows having their zero indications angularly spaced progressively from the zero indication of the first-mentioned row and in alinement successively with weight indications of said first-mentioned row, and a swinging index hand coöperating with all of said rows and bearing indications distinguishing the several rows by the extent of the displacement of their zero indications.

4. In a scale, and in combination with the weighing mechanism thereof, a chart having 16 rows of weight indications thereon, one of said rows having its zero indication adjacent one edge of the chart and bearing ounce graduations, and the other rows having their zero indications angularly spaced progressively from the zero indication of the first-mentioned row and in alinement successively with the ounce indications of said first-mentioned row, and an index hand moving over said chart and bearing indicating numerals distinguishing the several rows by the number of ounces the zero indications of the rows are behind the zero indication of the first-mentioned row.

5. In a scale, and in combination with the weighing mechanism thereof, a chart having a plurality of concentric rows of weight indications thereon, said rows having their zero indications out of radial alinement with each other and angularly spaced progressively equal distances from each other, and an index hand pivoted at the common center of said rows and moving over said chart and bearing indications distinguishing the several rows by the extent of the displacement of their zero indications.

6. In a scale, and in combination with the weighing mechanism thereof, a chart having a plurality of concentric rows of weight numerals thereon, one of said rows having its zero indication adjacent one edge of the chart, and the remaining rows having their zero indications angularly spaced progressively from the zero indication of the first-mentioned row and in radial alinement successively with weight indications of the said first-mentioned row, and an index hand pivoted at the common center of said rows and moving over said chart and bearing indicating numerals distinguishing the several rows by the extent of the displacement of their zero indications.

7. In a scale, and in combination with the weighing mechanism thereof, a chart having 16 concentric rows of weight indications thereon, one of said rows having its zero indication adjacent one edge of the chart and bearing ounce graduations, and the other rows having their zero indications angularly spaced progressively from the zero indication of the first-mentioned row and in radial alinement successively with the ounce indications of said first-mentioned row, and an index hand moving over said chart and bearing indicating numerals distinguishing the several rows by the number of ounces the zero indications of the rows are behind the zero indication of the first-mentioned row.

8. In a tare and net weight scale, a platform, a scale beam, leverage mechanism connecting the platform and scale beam, a tare beam carried by the scale beam and graduated to pounds, a pendulum counterbalance operated from the scale beam, a chart having a series of rows of weight indications arranged to show fractional pound tare and the net weight, one of the rows on said chart having its zero indication adjacent one edge of the chart, and the remaining rows having their zero indications spaced progressively from the zero indication of the first-mentioned row, and an index hand carried by the pendulum counterbalance and bearing indications distinguishing the several rows by the extent of the displacement of their zero indications.

9. In a tare and net weight scale, a platform, a scale beam, leverage mechanism connecting the platform and scale beam, a tare beam carried by the scale beam and graduated to pounds, a pendulum counterbalance operated from the scale beam, a chart having a series of concentric rows of weight indications arranged to show fractional pound tare and the net weight, one of the rows on said charts having its zero indication adjacent one edge of the chart and bearing ounce graduations, and the remaining rows having their zero indications spaced progressively from the zero indication of the first-mentioned row and in radial alinements successively with the ounce graduations on said first-mentioned row, and an index hand carried by the pendulum counterbalance and bearing indicating numerals distinguishing the several rows by the number of ounces the zero indications of the rows are behind the zero indication of the first-mentioned row.

10. In a tare and net weight scale, a platform, a scale beam, leverage mechanism connecting the platform and scale beam, a tare beam carried by the scale beam and graduated to pounds, a supplemental tare beam carried by the scale beam and graduated to counterbalance items of a composite tare, a pendulum counterbalance operated from the scale beam, a chart having a series of rows of weight indications arranged to show fractional pound tare and the net weight, one of the rows on said charts having its zero indication adjacent one edge of the chart, and the remaining rows having their zero indications spaced progressively from the zero indication of the first-mentioned row, and an index hand carried by the pendulum counterbalance and bearing indications distinguishing the several rows by the extent of the displacement of their zero indications.

11. In a tare and net weight scale, a platform, a scale beam, leverage mechanism connecting the platform and scale beam, a tare beam carried by the scale beam and graduated to pounds, a pendulum counterbalance connected to swing simultaneously with the scale beam, a chart having a series of rows of weight indications arranged to show fractional pound tare and net weight, one of the rows on said chart having its zero indication adjacent one edge of the chart, and the remaining rows having their zero indications angularly spaced progressively from the zero indication of the first-mentioned row, and an index hand carried by the pendulum counterbalance and bearing indications distinguishing the several rows by the extent of the displacement of their zero indications.

12. In a tare and net weight scale, a platform, a scale beam, leverage mechanism connecting the platform and scale beam, a tare beam carried by the scale beam and graduated to pounds, a pendulum counterbalance connected to swing simultaneously with the scale beam, a chart having a series of concentric rows of weight indications arranged to show fractional pound tare and net weight, one of the rows on said chart having its zero indication adjacent one edge of the chart and bearing ounce graduations, and the remaining rows having their zero indications angularly spaced progressively from the zero indication of the first-mentioned row and in radial alinement successively with the ounce graduations on said first-mentioned row, and an index hand carried by the pendulum counterbalance and bearing indications distinguishing the several rows by the extent of the displacement of their zero indications.

13. In a scale, in combination with the weighing mechanism thereof, a chart, and an index hand relatively movable about an axis extending perpendicularly to the face of said chart, said chart having a series of weight characters arranged in concentric rows about said axis, the characters in the respective rows being successively displaced equal angular distances from the radial positions of the characters of the same values in the adjacent rows, the index hand bearing a series of characters so positioned as to travel respectively over the concentric rows on the chart and of such values that the sum of the weight character marking any portion of the index hand and the chart weight character indicated by such portion will be the same in all of the concentric rows.

14. In a scale, in combination, means to offset integral divisions of tare, automatic means to offset net weight and fractional divisions of tare, and an indicating device connected to said automatic offsetting means, comprising a chart and an index coöperating therewith, said chart and index bearing characters so arranged that different portions of said index indicate different weight values on said chart, but the sum of the weight value of any character borne by the index and the weight value of the chart character indicated by the corresponding portion of the index is the weight value of the load offset by the automatic offsetting means.

HENRY THEOBALD.

Witnesses:
H. S. BERGEN,
KARL E. HAYES.